United States Patent
Blicker et al.

(10) Patent No.: US 8,886,242 B2
(45) Date of Patent: Nov. 11, 2014

(54) PUSH-TO-TALK INTERWORKING

(75) Inventors: Stephan Blicker, Wachtberg-Villip (DE); Matthias Britsch, Königswinter (DE); Norbert Esseling, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 715 days.

(21) Appl. No.: 10/570,557

(22) PCT Filed: Sep. 2, 2004

(86) PCT No.: PCT/EP2004/009774
§ 371 (c)(1),
(2), (4) Date: Mar. 12, 2007

(87) PCT Pub. No.: WO2005/025255
PCT Pub. Date: Mar. 17, 2005

(65) Prior Publication Data
US 2007/0275747 A1   Nov. 29, 2007

(30) Foreign Application Priority Data
Sep. 4, 2003  (EP) .................................... 03020089

(51) Int. Cl.
| | |
|---|---|
| H04B 7/00 | (2006.01) |
| H04L 29/06 | (2006.01) |
| H04M 15/00 | (2006.01) |
| H04W 76/00 | (2009.01) |
| H04W 4/10 | (2009.01) |
| H04W 4/24 | (2009.01) |
| H04W 88/16 | (2009.01) |

(52) U.S. Cl.
CPC ............ *H04W 4/10* (2013.01); *H04L 65/4061* (2013.01); *H04M 15/50* (2013.01); *H04W 76/005* (2013.01); *H04M 2215/46* (2013.01); *H04M 2215/2026* (2013.01); *H04M 15/49* (2013.01); *H04W 4/24* (2013.01); *H04M 2215/52* (2013.01); *H04M 2215/32* (2013.01); *H04W 88/16* (2013.01); *H04M 2215/2093* (2013.01); *H04L 65/1016* (2013.01)
USPC ........................................................ 455/518

(58) Field of Classification Search
USPC ........................................................ 455/518
See application file for complete search history.

(56) References Cited

U.S. PATENT DOCUMENTS

| | | | |
|---|---|---|---|
| 5,758,083 A * | 5/1998 | Singh et al. ................... | 709/223 |
| 6,304,558 B1 | 10/2001 | Mysore | |
| 2002/0077136 A1 * | 6/2002 | Maggenti et al. ............. | 455/518 |
| 2002/0150091 A1 | 10/2002 | Lopponen et al. | |
| 2002/0150092 A1 | 10/2002 | Bontempi et al. | |
| 2003/0195001 A1 * | 10/2003 | Tari et al. ................... | 455/435.2 |
| 2004/0047332 A1 * | 3/2004 | Bensimon et al. ............ | 370/347 |
| 2005/0009537 A1 * | 1/2005 | Crocker et al. ............ | 455/456.3 |

\* cited by examiner

*Primary Examiner* — Ankur Jain
(74) *Attorney, Agent, or Firm* — The Maxham Firm

(57) ABSTRACT

A method and system for operating a push-to-talk communication between a PoC-group consisting of at least of one member of a first communication network and a PoC-group consisting of at least of one member of a second communication network, using a PoC application server in each communication network. Members of the PoC-group of the first network operator are connected with the members of the PoC-group of the second network operator, and the PoC application servers are synchronized to each other.

10 Claims, 5 Drawing Sheets

PUSH-TO-TALK INTERWORKING

The present invention relates to interworking between separate communication networks using dialled connections, and especially to a Push-to-Talk communication method and system for enabling a subscriber to communicate with one or more other subscribers of one or more communication networks without using a dialling procedure.

DISCUSSION OF PRIOR ART

It is well known to use a dialing procedure in digital communication systems to set up a communication path between two subscribers of a communication network or between two subscribers of different communication networks.

U.S. Pat. No. 6,304,558 discloses a network dispatch management system for providing a dispatch service to dispatch clients via a packet-switched networks, such as the internet. This also includes a packet-switched communication originating from a wireless communication system.

SUMMARY OF THE INVENTION

It is a purpose of the present invention to provide methods and systems for providing Push-to-Talk services between subscribers of different operators.

The invention provides solutions for Push-to-Talk services interworking between different network operators, for example, interworking between Operator 1 and Operator 2. As there is no standard mechanism specified in order to realize the interworking a technical solution according to this invention is set forth below.

The Push-to-Talk feature enables a user to send a message, either streamed or transferred, to another user or a group of users after pressing a button or initializing a start signal in another known technique. Special actions have to be taken to organize a Push-to-Talk Group across operators.

Within the text of this description, the abbreviation "PoC" means Push-to-Talk over a communication system. "PoC AS" means Push-to-Talk over a Communication system application server. "Operator" means a (network) operator providing Push-to-Talk services.

A first embodiment of the invention provides a method for operating a Push-to-Talk communication between a PoC-group consisting of at least of one member of a first communication network and a PoC-group consisting of at least of one member of a second communication network. Using a PoC application server in each communication network is characterised by the steps of connecting the members of the PoC-group of the first network operator with the members of the PoC-group of the second network operator, and synchronising the PoC application servers to each other.

A second embodiment of the invention provides a method for Push-to-Talk communication between the members of an existing Push-to-Talk communication session and a group of an additional communication network, using a PoC application server in each communication network. This embodiment includes the steps of connecting the additional group to each of the existing groups of the session, and synchronising the PoC application server of the additional group to the previously synchronised PoC application servers.

The proposed Push-to-Talk interworking has several advantages.

The above mechanisms may be used for Push-To-Talk systems or any other system using group communication in any form. Further, the mechanisms apply to fixed/wireless and circuit/packet based communication networks.

Any address scheme, for example, IP-address, phone numbers, SIP-URIs, ULRs, email-addresses, among others, may be used to identify the users and groups. Dedicated signaling protocols are used to exchange information about the groups, such as size, member, status of the members, and the mechanisms may be used with two or more operators simultaneously.

BRIEF DESCRIPTION OF THE DRAWING

The objects, advantages and features of the invention will be more clearly perceived from the following detailed description, when read in conjunction with the accompanying drawing, wherein.

DETAILED DESCRIPTION OF THE PREFERRED EMBODIMENTS

Figure 1:
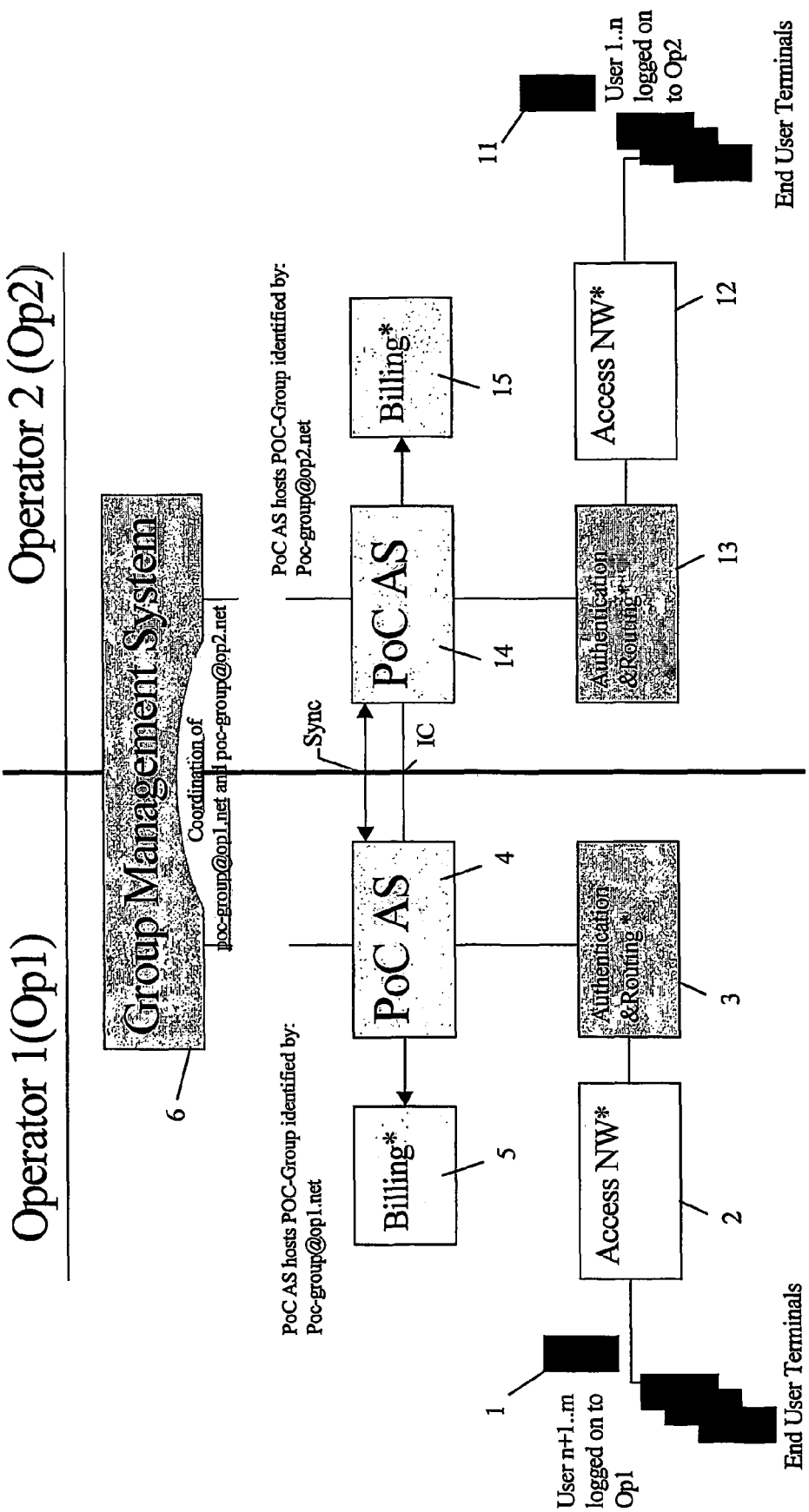
FIG. 1 is a block diagram showing the situation when two network operators offer Push-to-Talk groups to each other.

In FIG. 1 the architecture is shown when two operators offer Push-to-Talk groups to each other. On the left hand side there is shown the domain of Operator 1(OP1). There is a number (1+n . . . m) of users (subscribers) with their end terminals 1 logged on to Operator 1. Operator 1 preferably operates his own access network 2 to provide access to his telecommunication services. There is preferably an authentication and routing element 3 which authenticates the users and routes the connection to the required services and/or destinations.

According to the invention, Operator 1 provides a PoC application server 4 (PoC AS) which hosts a Push-to-Talk group which is identified, for example, by the address "Poc-group@op1.net." The users 1+n . . . m can be members of this Push-to-Talk group. There may also be a billing facility 5 to charge the utilised communication services to the users.

On the right hand side there is shown the domain of Operator 2 (OP2). There is a number (1 . . . n) of users (subscribers) with their end terminals 11 logged on to Operator 2. Operator 2 may operate an access network 12 to provide access to his telecommunication services. There also can be an authentication and routing element 13 which authenticates the users and routes the connection to the required services or destinations, or both.

According to the invention, Operator 2 also provides a PoC application server 14 (PoC AS) which hosts a Push-to-Talk group which is identified, for example, by the address "Poc-group@op2.net." The users 1 . . . n can be members of this Push-to-Talk group. There may also be a billing facility 15 to charge the required communication services to the users.

The PoC application server 4 of Operator 1 is connected via a synchronization connection and (sync) interworking connection (IC) with PoC application server 14 of Operator 2

The coordination of both Push-to-Talk groups, that is "Poc-group@op1.net" and "Poc-group@op2.net," is managed by common group management system 6.

Operator 1 and Operator 2 negotiate an agreement, that Operator 2 is allowed to offer the Push-to-Talkgroup"Poc-group@op2.net" and Operator 1 is allowed to offer the Push-to-Talk group "Poc-group@op1.net" to the other operator, respectively. Accordingly, the users n+1 . . . m join the group Poc-group@op2.net from Op1 side and the users 1 . . . n join the group Poc-group@op1.net from Op2 side.

Via the synchronization connection a synchronization takes place between Operator 1 and Operator 2 PoC application servers 4 and 14, so the group members of Poc-group@op1.net and Poc-group@op2.net are known to both operators, that is, Operator 2 and Operator 1. The synchronization is carried out automatically by the PoC application servers 4 and 14. There may also be a synchronization whenever a user requests update of all group members of Poc-group@op1.net and Poc-group@op2.net before sending a PoC message.

Figure 2:
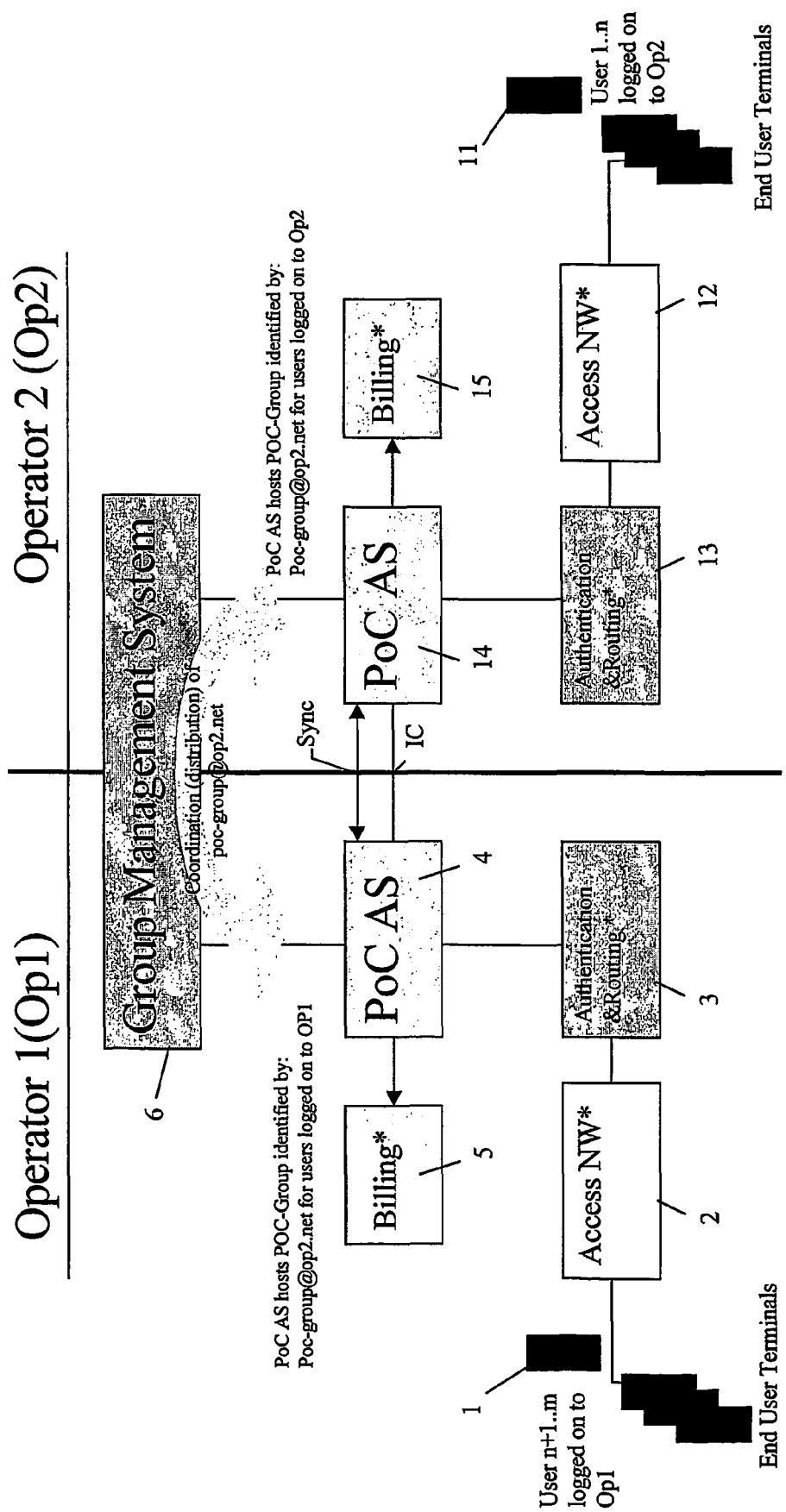
FIG. 2 is a block diagram similar to FIG. 1, showing the situation when only operator 2 offers Push-To Talk groups to customers of operator 2 and 1.

FIG. 2 shows an identical architecture as FIG. 1. In the depicted situation only Operator 2 offers Push-To-Talk groups to customers of both Operator 2 and Operator 1. Operator 1 and Operator 2 negotiate an agreement that Operator 2 is allowed to offer the group Poc-group@op2.net. Accordingly, users n+1 . . . m join the Operator 2 group Poc-group@op2.net from the Op1 side and user 1 . . . n join the same group Poc-group@op2.net from the Op2 side.

A synchronization takes place between Operator 1 and Operator 2 PoC application servers 4 and 14, so the group members of Poc-group@op2.net are known to both Operator 1 and Operator 2, that is, the group members of Poc-group@op1.net are only known to Operator 1 but not to Operator 2. The synchronization takes place automatically by the PoC application servers 4 and 14 and also in case a user requests update of all group members before sending a PoC message.

Figure 3:
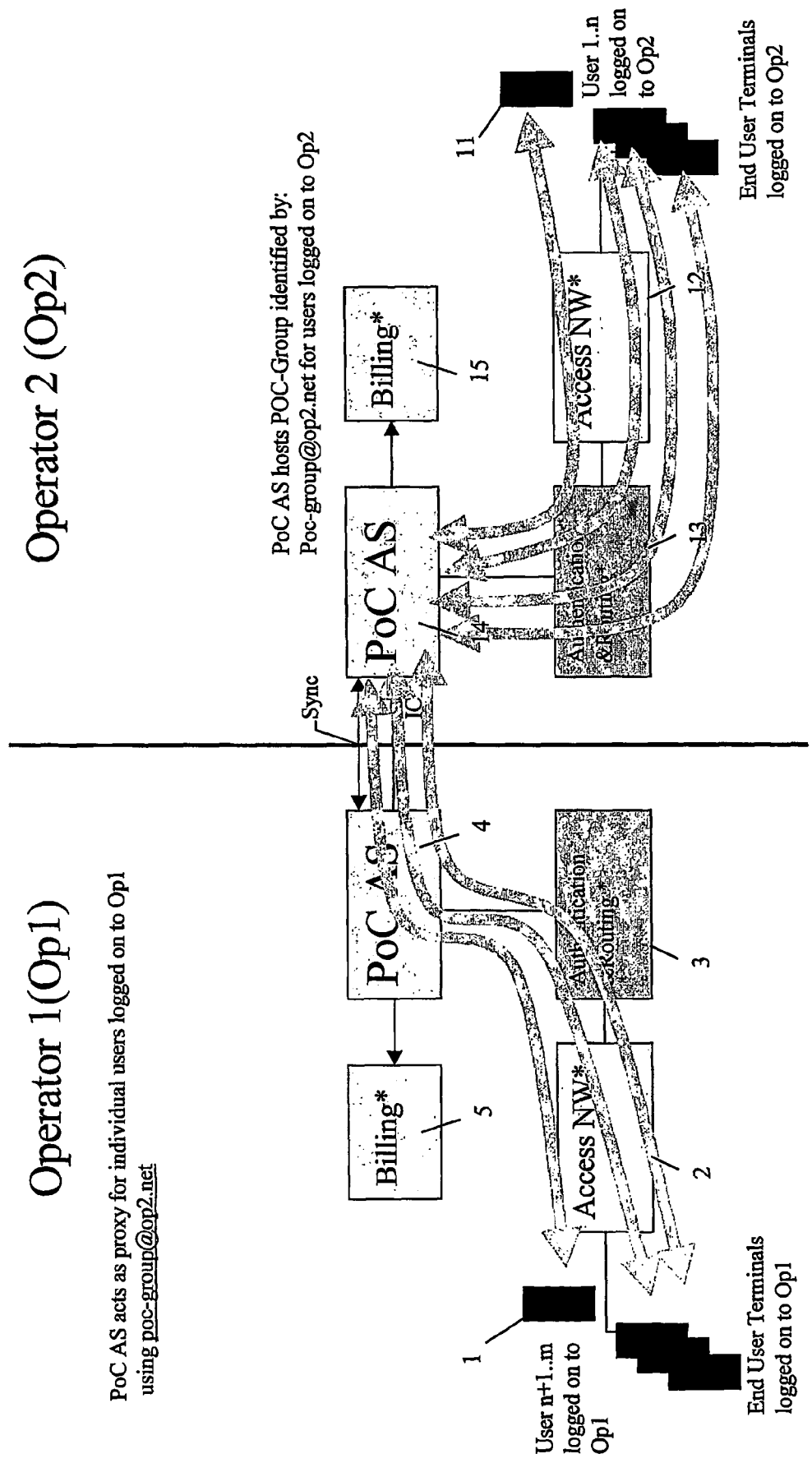
FIG. 3 is a similar block diagram showing a Push-to-Talk user signalling/traffic flow (Alternative 1)

FIG. 3 shows the Push-to-Talk user signalling/traffic flow according to a first alternative. Only OP2 is allowed to offer his group Poc-group@op2.net to Op1. User m with his terminal 1 logged to Op1 presses, for example, a special PoC button on his terminal. It is assumed that all or parts of the members of the Poc-group@op2.net are known/not known in the Op1 PoC application server due to synchronization/request mechanism.

The messages are terminated toward all users logged on to Op1 (except user m) and to the users of the group logged on to Op2.

PoC application server 4 in connection with billing facility 5 may generate billing records and interconnection (IC) records for accounting. PoC AS 4 of Op1 acts as proxy for a single user m of Poc-group@op2.net logged on to Operator 1 network and contact the PoC application server 14 for the group Poc-group@op2.net located at Operator 2. PoC application server 14 of Operator 2 may be identified by a address derived from the group address, that is, " . . . op2.net"

Figure 4:
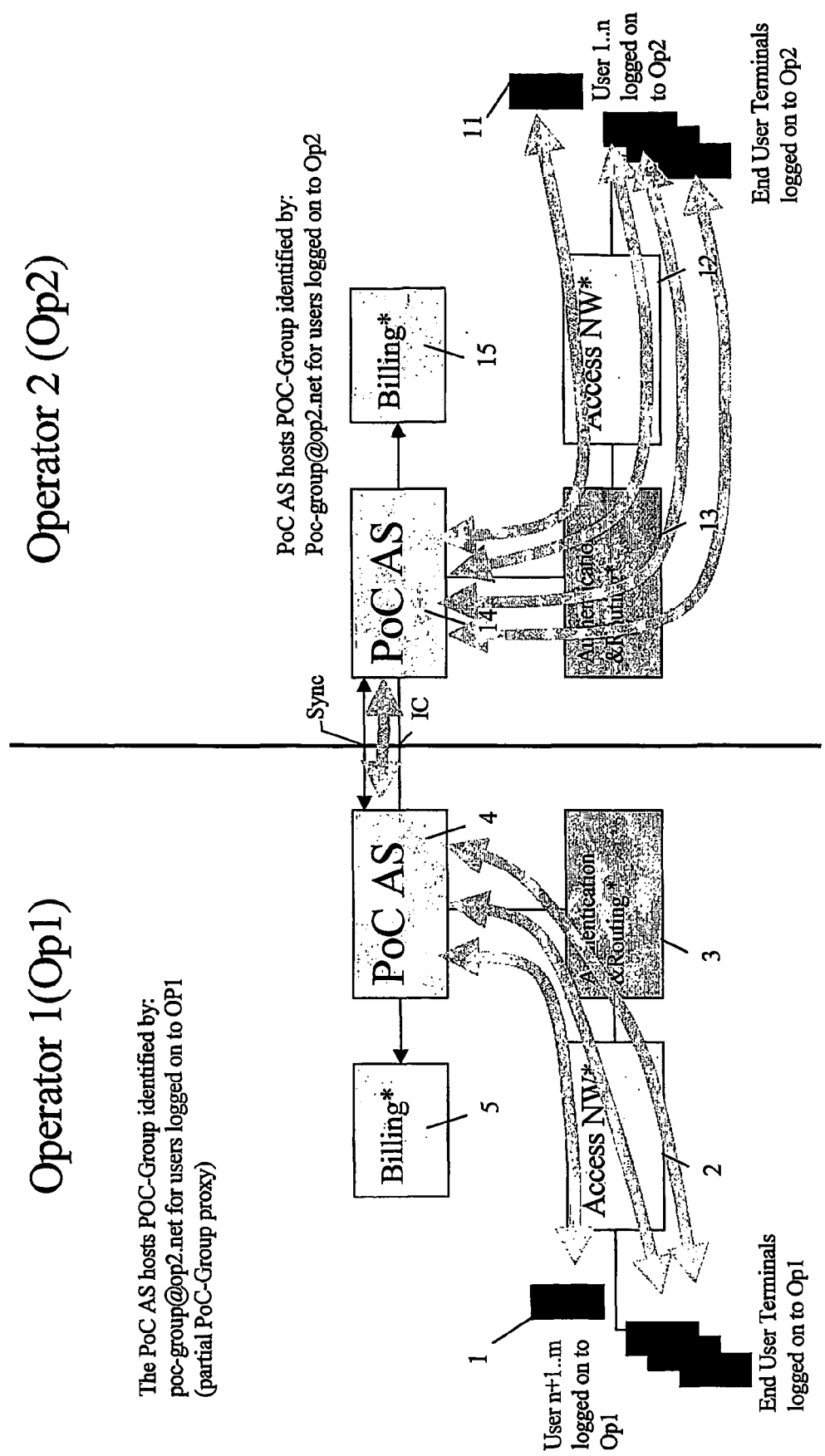
FIG. 4 is another block diagram showing the Push-to-Talk user signalling/traffic flow (Alternative 2)

FIG. 4 shows the Push-to-Talk user signalling/traffic flow according to a second alternative. Only OP2 is allowed to offer his group Poc-group@op2.net to Op1. User m with his terminal 1 logged to Op1 presses, for example, a special PoC button on his terminal, and all or parts of the members of the Poc-group@op2.net are known/not known in the Op1 PoC application server 4 due to synchronization/request mechanism.

The messages are terminated toward all users logged on to Op1 (except user m) and to the users of the group logged on to Op2.

The PoC application server 4 in connection with billing facility 5 may generate billing records and interconnection (IC) records for accounting. PoC AS 4 of Op1 acts as proxy for a single user of Poc-group@op2.net logged on to the Operator 1 network and contact the PoC application server 14 for the group located at Operator 2.

The PoC AS may also act as partial PoC group server (partial group proxy) for all users of Poc-group@op2.net logged on to the Operator 1 network and contact the PoC server 14 for the group Poc-group@op2.net. The traffic between the servers 4 and 14 may be a server-server connection combining the traffic of the partial groups.

The server of Operator 2 may be identified by an address derived from the group address, that is, " . . . op2.net".

Figure 5:
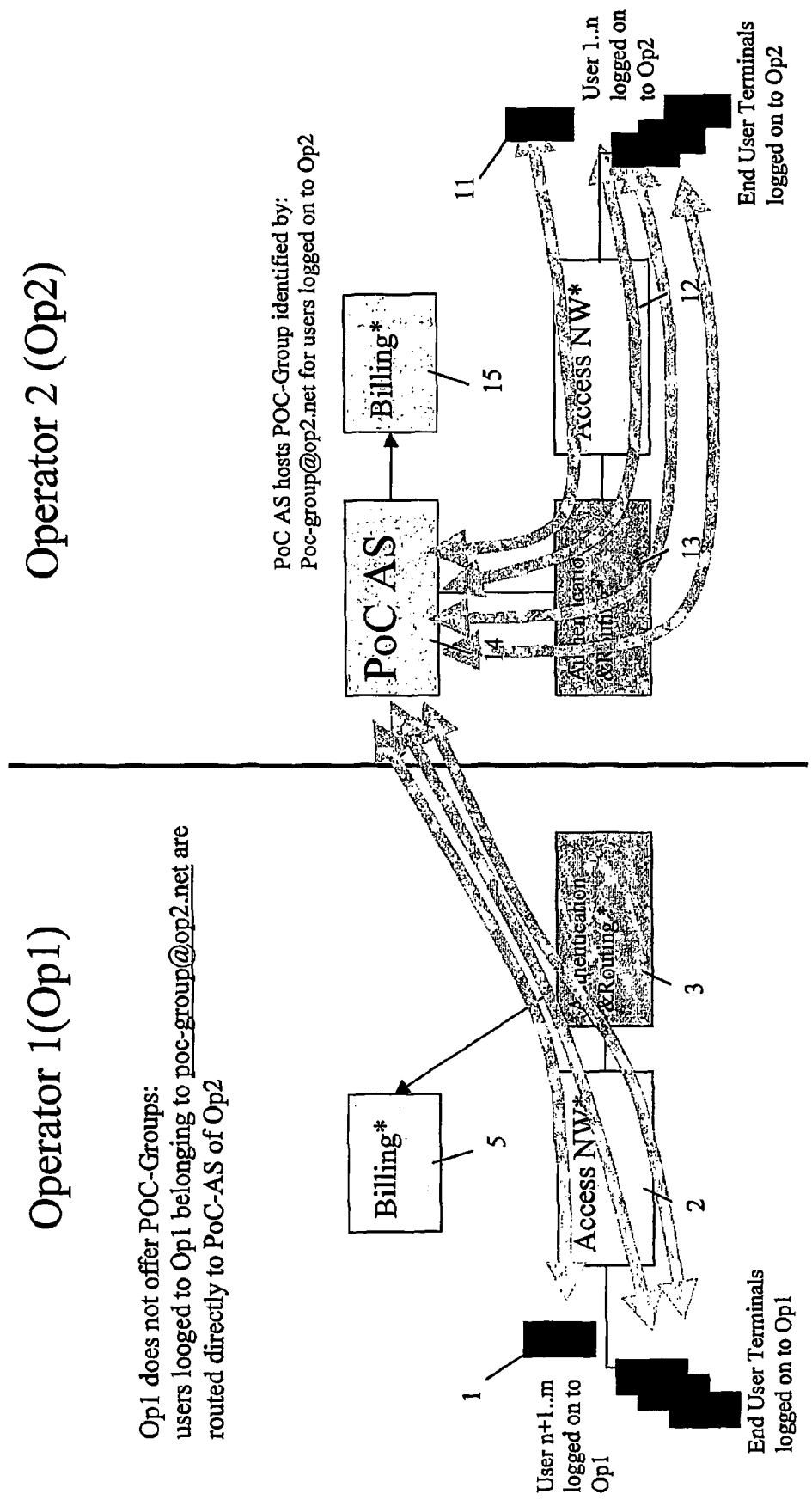
FIG. 5 is yet another similar block diagram showing the Push-to-Talk user signalling/traffic flow (Alternative 3).

FIG. 5 shows the Push-to-Talk user signalling/traffic flow according to a third alternative. OP2 is allowed to offer his group Poc-group@op2.net to Op1 and users of Op1 are allowed to use it. User m, with his terminal 1 logged to Op1, presses, for example, a special PoC button on his terminal and the message is directly routed to the PoC application server 14 of Operator 2.

The messages are terminated toward all users logged on to Op1 (except user m) and to the users of the group logged on to Op2.

PoC application server 4 in connection with billing facility 5 may generate billing records and interconnection (IC) records for accounting.

PoC application server 14 of Operator 2 may be identified by a address derived from the group address.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed only with reference to the claims and reasonable equivalents.

The invention claimed is:

1. A method of operating a push-to-talk communication between a Push-to-Talk communication system (PoC) group comprising at least one member of a first communication network operated by a first network operator, and a PoC group comprising at least one member of a second communication network operated by a second network operator, by using
    a PoC application server in each communication network, the method comprising:
    (a) connecting the at least one member of the PoC-group of the first network with the members of the PoC-group of the second network for push-to-talk communication; and
    (b) synchronizing the PoC application servers of the respective networks so that the group members of both networks are known to both operators;
    wherein the synchronization is carried out whenever a user requests an update of all group members of the PoC groups before sending a PoC message; and
    wherein step (b) comprises the steps of:
    (c) using an application server of a member of the PoC-group of the first network that is logged onto the first network as a proxy for an application server and contact for a member of the PoC-group of the second network; and
    (d) also using the application server that is used as a proxy as a partial PoC group server and contact for all members of the PoC-group of the second network that are logged onto the second network.

2. The method according to claim 1, wherein the synchronization is carried out automatically by the PoC application servers.

3. A method of operating push-to-talk communication between a group of members of an existing push-to-talk communication session within a first communication network operated by a first network operator, and a group of at least one member of an additional communication network operated by a second network operator, by using a Push-to-Talk over a communication system (PoC) application server in each communication network, the method comprising:
(a) connecting the additional group to the existing group of the session for push-to-talk communication; and
(b) synchronizing the PoC application server of the additional group to the application server of the existing group of the session so that the group members of the additional network are known to both operators and the group members of the existing group are known to the first operator but not to the second operator;
wherein the synchronization is carried out whenever a user requests an update of all group members of the PoC groups before sending a PoC message; and
wherein step (b) comprises the steps of:
(c) using an application server of a member of the PoC-group of the first network that is logged onto the first network as a proxy for an application server and contact for a member of the PoC-group of the second network; and
(d) also using the application server that is used as a proxy as a partial PoC group server and contact for all members of the PoC-group of the second network that are logged onto the second network.

4. The method according to claim 3, wherein the synchronization is carried out automatically by the PoC application servers.

5. The method according to claim 3, further comprising:
identifying the PoC application server of the additional group by an address derived from a group address assigned to the additional group.

6. A system for operating push-to-talk communication between push-to-talk groups of at least two communication networks operated by different operators, the system comprising:
at least one member of a PoC-group of a first said network connected with members of a PoC-group of a second said network for push-to-talk communication; and
at least one push-to-talk communication application server for each of the first and second networks, with the servers being synchronized so that the group members of the first network are known to both operators and the group members of the second network are known to at least the second operator;
wherein the synchronization is carried out whenever a user requests an update of all group members of the PoC groups before sending a PoC message; and
wherein an application server of a member of the PoC-group of the first network that is logged onto the first network is used as a proxy for an application server and contact for a member of the PoC-group of the second network; and
wherein the application server that is used as a proxy is also used as a partial PoC group server and contact for all members of the PoC-group of the second network that are logged onto the second network.

7. The system according to claim 6, wherein the communication networks are radio communication networks.

8. A method of operating a push-to-talk communication between a Push-to-Talk communication system (PoC) group comprising at least one member of a first communication network operated by a first network operator, and a PoC group comprising at least one member of a second communication network operated by a second network operator, by using a PoC application server in each communication network, the method comprising the steps of:
(a) connecting the at least one member of the PoC group of the first network with the members of the PoC group of the second network for push-to-talk communication; and
(b) synchronizing the PoC application servers of the respective networks so that the group members of both networks are known to both operators;
wherein step (a) comprises the steps of:
(c) using an application server of a member of the PoC-group of the first network that is logged onto the first network as a proxy for an application server and contact for a member of the PoC-group of the second network; and
(d) also using the application server that is used as a proxy as a partial PoC group server and contact for all members of the PoC-group of the second network that are logged onto the second network.

9. A method according to claim 8, wherein step (a) further comprises the step of:
(e) using a server-to-server connection between the application server of the member of the PoC group of the first network and the application server of the member of the PoC group of the second network to combine traffic of the partial groups.

10. A method according to claim 8, wherein step (b) comprises the step of:
(f) synchronizing the PoC application, servers of the respective networks whenever a user requests an update of all group members of the PoC groups before sending a PoC message.

* * * * *